United States Patent [19]
Ogle et al.

[11] 3,922,957
[45] Dec. 2, 1975

[54] MICROFLOW METERING PUMP

[75] Inventors: David G. Ogle, Sunnyvale; John T. Taylor, Santa Clara, both of Calif.

[73] Assignee: Beckman Instruments, Inc., Fullerton, Calif.

[22] Filed: Apr. 8, 1974

[21] Appl. No.: 459,111

[52] U.S. Cl. ................................................. 92/137
[51] Int. Cl.² ............................................ F01B 9/00
[58] Field of Search ...................................... 92/137

[56] References Cited
UNITED STATES PATENTS

| | | | |
|---|---|---|---|
| 2,666,658 | 1/1954 | Laucks................................... | 92/137 |
| 3,659,502 | 5/1972 | Friedman et al...................... | 92/137 |

*Primary Examiner*—William L. Freeh
*Assistant Examiner*—G. P. LaPointe
*Attorney, Agent, or Firm*—R. J. Steinmeyer; F. L. Mehlhoff

[57] ABSTRACT

A metering pump is provided with stroke adjustment and having a laterally, stress-free, self-aligning piston with a floating seal. A wire coupling is utilized between the pump piston and a plunger reciprocated by a drive motor. The wire is so mounted as to be preloaded in tension but may bend. The piston is positively driven in the axial direction but floats free laterally with no lateral force applied and with no linear backlash. Thus, the piston is positively driven, absolutely rigid in the axial direction. The arrangement is suitable for a relatively delicate and brittle piston acted upon by relatively large liquid pressure and driving force.

12 Claims, 9 Drawing Figures

MICROFLOW METERING PUMP

BACKGROUND OF THE INVENTION

Microflow pumps are those capable of delivering fluid accurately metered and at very low flow rates. Pumps with flow rates from zero to 30 milliliters per hour are needed in analytical work, for instance in amino acid analyzers as a column eluent and a reagent blending metering pump. This is a definite requirement for micro-column chromatography and is an important key to the operation of the whole system in a micro-column chromatograph. Reagent blending downstream of the column must be performed accurately and smoothly, as the sensitivity of the detection system is such that any fluctuation in delivery of the metering pumps would be detected by the visible photometer, and appear as base line noise.

Various types of metering pumps have been proposed in which ball check or other types of check valves are employed and variation of stroke length is utilized to adjust the flow rate. Adjustment of stroke length has been proposed by introducing a greater or less amount of "lost motion" in the stroke by the adjustment of stops to limit the displacement of the piston. Examples are illustrated by U.S. Pat. No. 2,928,351 to Klinger; U.S. Pat. No. 3,461,805 to Karkow; and apparatus sold by Beckman Instruments, Inc. as the "Beckman Accu-Flo Metering Pump." A fluid flow pump for transferring accurate volumes of fluids continuously at relatively low flow rates and at high pressures, having a small diameter piston attached to a reciprocating plunger moved on a return stroke by a compression spring is described in the U.S. Pat. No. 3,125,963 to Whitley et al. and assigned to the same assignee as the present application. A floating seal stem assembly for the stem of a gate valve operated by a pressure actuated ram is proposed in U.S. Pat. No. 3,624,802 to Ripert with the valve stem itself held rigid by a rigid connection to the plunger or ram.

It is an object of the invention to provide a microflow metering pump of adjustable rate, of the amplitude modulated type, providing gradual acceleration and deceleration at any rate of flow adjustment or any length of stroke.

A further object of the invention is to avoid excessive periodic changes in velocity and acceleration, with smooth pump action, restricted pressure excursions, damping out of the dynamic action of ball seat assemblies, with positive valve seating and relatively little wear and shock loading of the parts, with an eccentric drive having constant contact with the piston driving plunger, without discontinuities in the curves plotted against time of displacement, velocity and acceleration of the piston.

A further object of the invention is to accomplish the foregoing advantages in a metering pump capable of operating at very low flow rates, metering fluid precisely at relatively high back pressures, accomplishing floating action without the necessity of tight tolerances or extensive adjustments.

Other and further objects, features and advantages of the invention will become apparent as the description proceeds.

SUMMARY OF THE INVENTION

In carrying out the invention in a preferred form thereof a motor drive with an eccentric cam actuating a plunger is utilized to drive a piston connected to the plunger. The piston is connected to the plunger by a wire preloaded in tension by axial abutment between an end surface of the plunger and a surface of the piston holder. One of the abutting surfaces is spherical so that lateral bending between the axes of the piston and the plunger is permitted within confined limits. The connection is rigid with respect to axial movement but the connecting wire, the piston and its seals are permitted to float laterally. A compression spring serves to return the plunger on a return stroke toward the eccentric cam.

Full, continuous adjustment of the plunger stroke between zero and a maximum to provide adjustment between zero flow and maximum flow is accomplished by mounting the cam with an axis laterally adjustable with respect to the axis of the driving shaft to which it is connected. To this end the shaft has an eccentric extension; the cam is mounted on a cam adjuster which has an eccentric bore fitting the eccentric extension of the shaft so that rotation of the cam adjuster results in adjusting the degree of eccentricity of the cam.

A better understanding of the invention will be afforded by the following detailed description considered in conjunction with the accompanying drawings.

DRAWINGS

Figure 1:
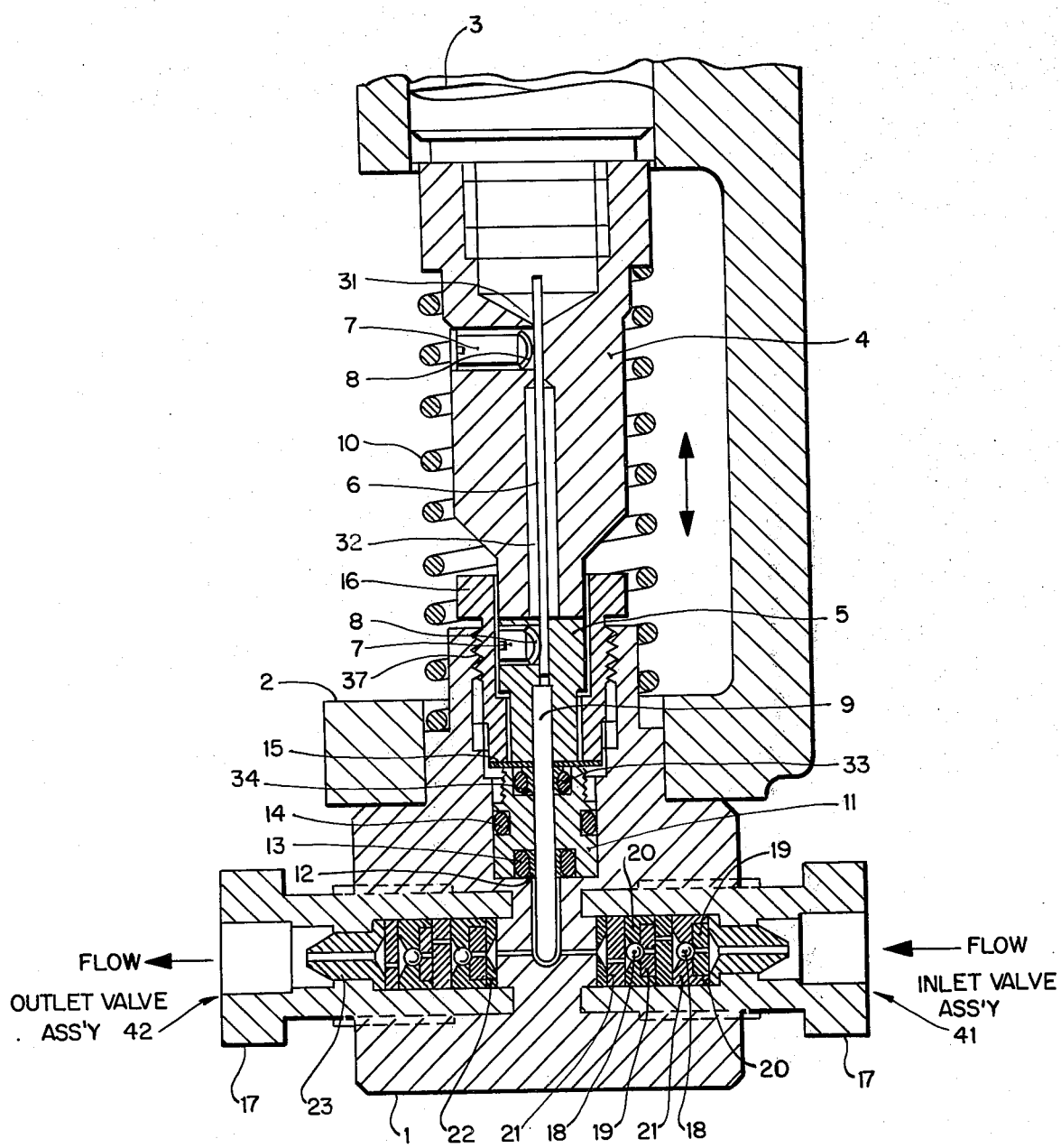
FIG. 1 is a view of a longitudinal section of the liquid end, valve assembly, piston and plunger of a microflow metering pump represented as cut by a plane through the longitudinal axis of the piston and plunger.
Figure 4:
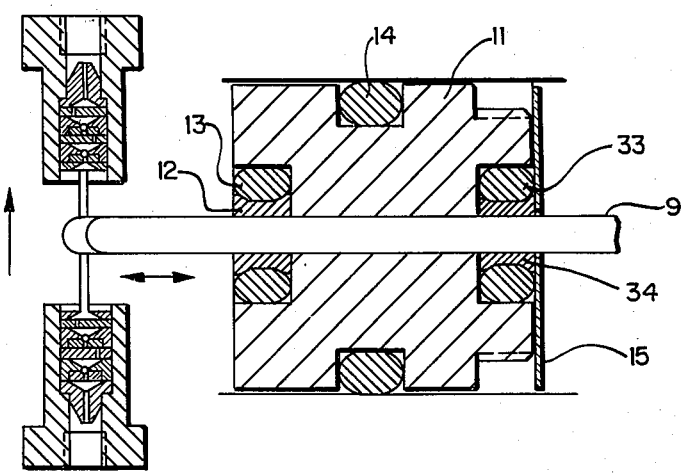
Figure 3:
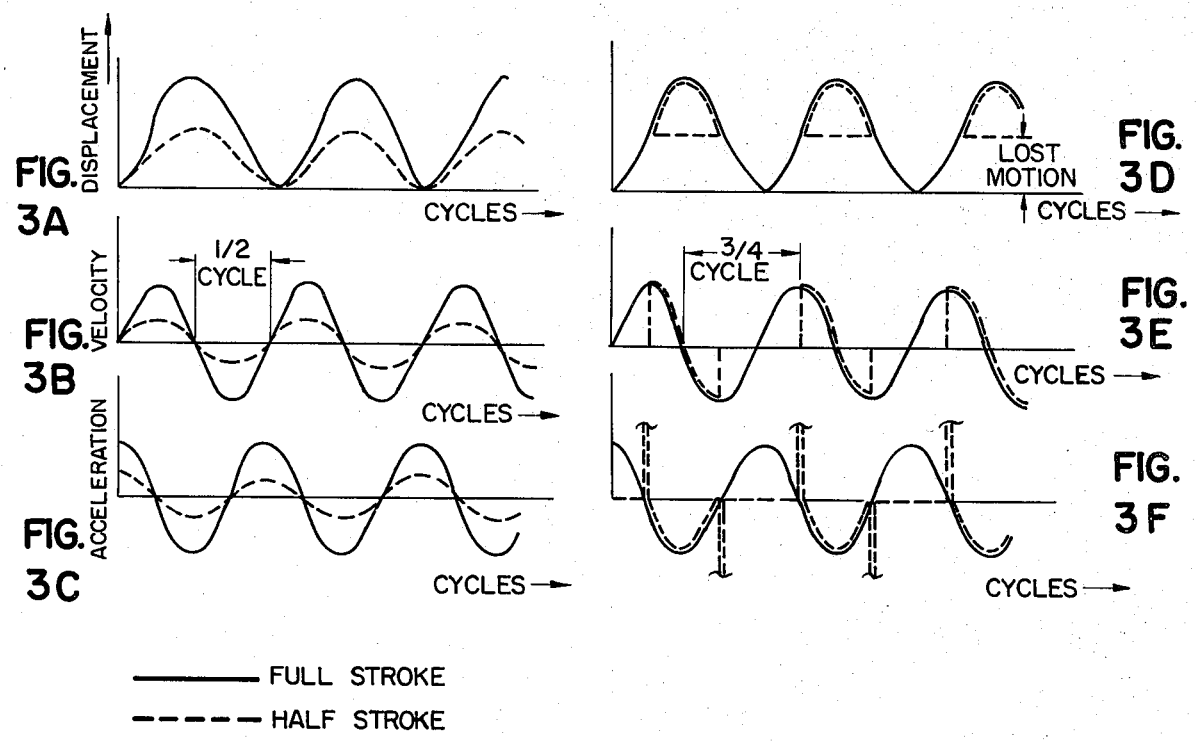

FIG. 3 (consisting of subfigures 3A to 3F) is a set of graphs illustrating displacement, velocity and acceleration curves for reciprocating pumps with amplitude modulated stroke adjustment compared with corresponding curves for reciprocating pumps with lost motion stroke adjustment; and FIG. 4 is a fragmentary view of a portion of the apparatus of FIG. 1 showing floating seals for the piston in greater detail at enlarged scale.

Like reference characters are utilized throughout the drawings to designate like parts.

DETAILED DESCRIPTION

The embodiment of the invention illustrated in the drawings comprises an eccentric driven pump having a liquid end 1 attached to a supporting frame 2. As shown in FIG. 1, there is a plunger 3 acted upon by a pump drive assembly (shown in FIG. 2) to produce reciprocating motion of the plunger 3. The plunger 3 has an extension 4 adapted to bear axially against a piston holder 5 and there is a coupling wire 6 clamped to the plunger extension 4 and the piston holder 5 by means of set screws 7 acting upon wire clamping slugs 8, for connecting the plunger extension 4 and the piston holder 5. A relatively small diameter, long piston 9 is utilized which is secured in the piston holder 5 by any suitable manner, as by an adhesive such as epoxy resin.

A compression spring 10 is provided for returning the piston from its forward or fluid delivery stroke. For sealing of fluid pressure around the piston 9, a seal cartridge 11 is provided containing a cap seal 12 and a relatively large O-ring 13, shown to a larger scale in FIG.

4. The O-ring is composed of conventional resilient natural or synthetic rubber-like material and the cap seal is preferably composed of a suitable synthetic fluorocarbon material, such as polytetrafluoroethylene, of the type sold under the mark "Teflon." An O-ring 14 is also provided for sealing the seal cartridge 11 itself within the liquid end 1. There is a seal retaining washer 15 held in place by a threaded bushing or clamping screw 16 having a threaded joint 37 with the liquid end 1.

An inlet check valve assembly 41 and an outlet check valve assembly 42 are provided, which are similar in construction, each consisting of a valve cartridge 17 containing a pair of check balls 18, cooperating seats 19 with valve guides 20, ball stops 21 and a sealing washer 22. In each case the sealing washer 22 is against the liquid end or valve body 1 so that, for the outlet valve assembly 42, the sealing washer is on the inlet end of the outlet valve assembly, whereas in the case of the inlet valve assembly 41, the sealing washer 22 is on the outlet end of the inlet valve assembly. Flare type fittings 23 are also provided at the inlet and outlet ends of the inlet valve and the outlet valve assemblies 41 and 42, respectively, with suitable conventional conical surfaces to cooperate with flared end, conventional, connecting tubing (not shown) for flared joints of conventional form.

As shown in FIG. 4, fluid pressure is contained from leaking to the outside by the O-ring 13 which also engages the surface of the liquid end around the piston 9. The seal around the piston 9 is also effected with a relatively thin cap-seal sleeve 12 made of the fluorocarbon material, utilizing the large O-ring 13 to provide the sealing force to the sleeve. With increasing fluid pressure the O-ring applies more sealing force to the sleeve, thus providing leak-free performance of the reciprocating piston assembly. As shown more clearly to enlarged scale in FIG. 4, a second seal comprising an O-ring 33 and a cap seal 34 are provided which also act as a floating seal to guide the piston 9 and provide stability to the piston assembly. The second seal prevents tilting of the piston and maintains alignment. In addition, the second seal acts as a back-up seal for any leakage past the first seal should any such leakage occur.

The piston 9 is preferably made of a very hard material such as synthetic sapphire, for example, and is fastened in such a way as to be self-aligning in a lateral direction but absolutely rigid in the axial direction. The coupling wire 6 provides for this freedom of motion in the end of the plunger extension 4, being laterally movable in the lower end of plunger extension 4.

In reciprocating systems employing a number of connected parts, there tends to be an accumulation of linear and concentric tolerances. This together with the comparatively large liquid pressures and driving forces acting on a relatively delicate and brittle piston necessitates extremely tight manufacturing tolerances in commonly known conventional couplings as well as careful assembly and adjustment to eliminate linear backlash and imperfection in concentricity in the reciprocating movement. Such problems are minimized or avoided in the disclosed construction by providing smooth abutting surfaces for the plunger extension 4 and the piston holder 5. The abutting surface of one or the other, for example as shown on the end of the plunger extension 4, has a substantially spherical surface to provide a stress-free alignment in conjunction with the coupling wire 6 which is relatively long in comparison with its diameter and therefore free to bend slightly to afford lateral and angular freedom of the piston holder 5 and the piston 9.

The wire 6 is composed of a suitable material, such as spring steel, which has a relatively high modulus of elasticity and is pulled tight through the end 31 of the plunger-extension bore before clamping by the screws 7 so that the plunger extension 4 and the piston holder 5 remain in virtual contact during the complete cycle. Lateral movement is unrestricted within the clearance limits of the parts since the wire is not confined along its working length by reason of an enlargement 32 in the lower portion of the wire-receiving bore of the plunger extension 4; and the diameter-length ratio of the wire is so selected that it is free of stress and strain from the cantilever type bending to which it is subjected. The curvature on the mating surface of the plunger extension 4 allows some angular deflection and relative angular movement of the piston and the plunger. In the discharge or forward stroke the compression of the plunger extension 4 relieves the tensile load on the wire 6 but the forward movement of the plunger extension 4 assures contact between the bending surfaces. The tightness of the wire provides so little extension thereof when subjected to load during the suction or backward stroke of the plunger extension 4 that the abutting surfaces tend to remain in contact.

As shown in the drawings, the internal passages in the liquid end 1 of the assembly are of small diameter to provide low fluid "hold up" or entrapment. In the ball check valve area, the parts are also relatively small, and made of inert materials, for example sapphire balls and seats, and chlorinated polytetrafluoroethylene (CTFE) ball guides, sealing washers and flare fittings or connectors. In addition, the ball and seat design is such as to limit the vertical travel of the ball to that necessary to allow full flow through the pump without causing a differential pressure build up. The lateral movement of the ball is also constrained to position the ball precisely above its seat in order to effect a positive sealing of the valve. This type of ball check valve design ensures a smooth as possible valve action, and consequently precise and repetitive metering of fluids.

Figure 2:
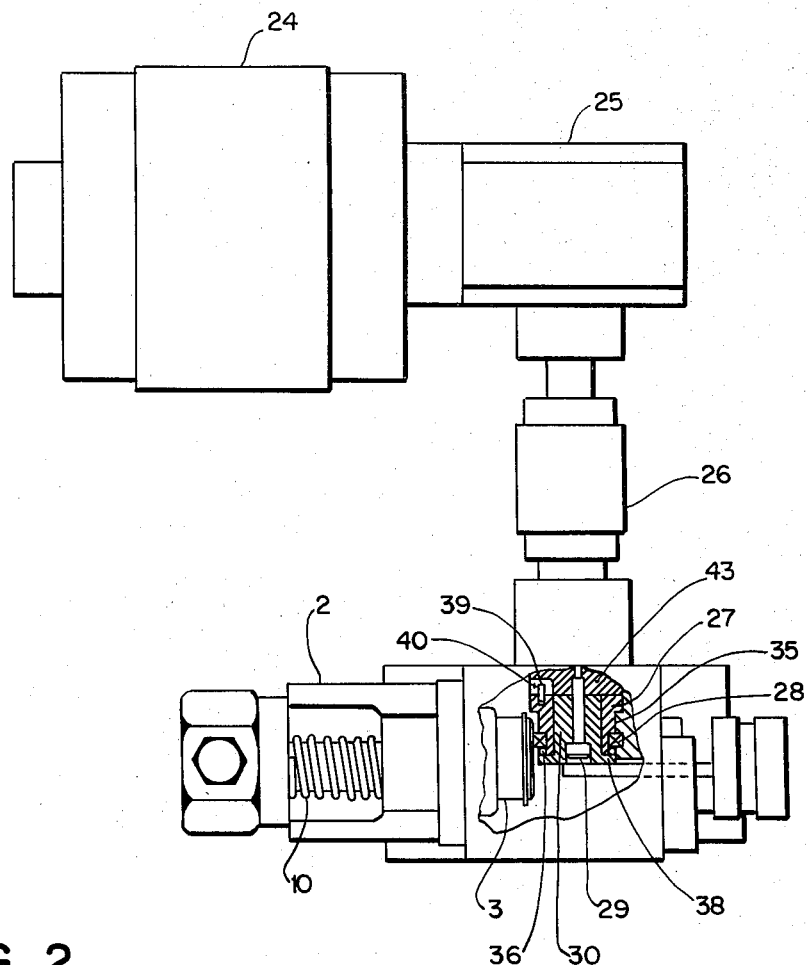
FIG. 2 is a top view of the pump with its motor and drive mechanism with a portion of the drive housing broken away to show the arrangement for adjusting the amplitude of the stroke of the piston.

As shown in FIG. 2, a constant speed electric motor 24, such as a synchronous alternating current motor, is provided for operating the pump. The relatively low rate of reciprocation for small flows is provided by utilization of a gear box 25 acting through a coupling 26 to apply uniform rotary motion to an eccentric cam 27. This cam has a ball bearing assembly 28 attached to its periphery to contact the bearing end 3a of plunger 3. In this manner rotary motion is converted to simple harmonic or sinusoidal reciprocating motion to operate the piston and drive it in the forward direction. The return spring 10 serves to maintain the load between the bearing end 3a and ball bearing assembly 28 at all times.

For amplitude modulation of the pump stroke the eccentric cam is mounted to be adjustable from no eccentricity for no piston stroke to the full extent of its eccentricity to provide the maximum piston stroke. Moreover, the adjustment is infinitely variable over this range. This is accomplished by providing a holding bolt 29 which is mounted eccentrically with respect to the axis of the drive shaft from the coupling 26, as shown in FIG. 2. The bolt 29 holds an eccentric 30 which fits into the bore of the cam bearing mount 27. The inner race of cam bearing 28 is rigidly retained on the step 35 in the bearing mount 27 by spacer 36 which is under the pressure from the head 38 of the bearing mount 27. The bearing mount 27 is prevented from rotation with respect to the end 43 of the drive shaft 26 by the dowel pin 39 engaged in the driving shaft groove 40, which, however, allows a radial displacement with respect to the driving shaft 43. To adjust the cam eccentricity the holding bolt is loosened and, while preventing shaft 43 from angular movement, the head 38 of the bearing mount is turned. Since the pin 39 prevents rotation of mount 27 it responds to the rotation of the eccentric 30 by lateral movement thus regulating the eccentricity of the bearing 28. After achieving the desired piston stroke, the cam assembly is locked by tightening the holding bolt 29.

Positive displacement, adjustable-stroke type metering pumps have heretofore been employed. However, the novel features of the construction disclosed herein enable our metering pump to operate at very low flow rates and meter fluid precisely at relatively high back pressures, having been tested to pressures as high as 3,000 psi. These advantages have been accomplished as a result of the fact that there is a floating piston permitting some lateral movement but nevertheless no axial play. The internal cap type seals composed of polytetrafluoroethylene are leak-free and smooth acting and prevent damaging contact between the piston and other parts. The small internal passages reduce fluid hold up. In addition, the miniaturized check valve parts result in a minimum fluid hold up and provide positive valve action. The amplitude modulated stroke gives smooth pump action and constant contact with the bearing on the drive mechanism.

As shown in FIG. 3, reciprocating pumps with amplitude modulated stroke adjustments have sinusoidal kinematic flow characteristics. Displacement, velocity and acceleration remain sinusoidal for various fractions of full stroke adjustment. Half-stroke is represented by dashed lines. However, with the lost motion type of stroke adjustment displacement, velocity and acceleration are nonsinusoidal as indicated by the dashed line curves representing half stroke in FIGS. 3D, 3E and 3F. As indicated in FIG. 3D, displacement occurs only during alternate half cycles of a sinusoidal wave. During such half cycles the velocity varies as shown in FIG. 3E from a maximum in one sense to a minimum in the opposite sense along a portion of a sinusoidal curve but then drops abruptly to zero and remains at zero for a half cycle, upon which it increases abruptly to a maximum in the original sense. Moreover, the variation in acceleration shown in FIG. 3F has even greater discontinuities and requires abrupt reversals of force to effect the necessary changes in acceleration. As shown by the dashed line portions of the curve, the acceleration during alternate half cycles appears to vary sinusoidally but at the end of each such half cycle and at the beginning of the next there is an abrupt peak with the acceleration falling to zero and remaining at zero for a half cycle until the abrupt peak in the opposite sense which is required to set the piston in motion again.

The invention has been described as carried out by utilizing a constant speed alternating current motor to drive the speed reducer. An additional change in output or adjustment in output may also be accomplished by utilizing a speed controlled variable speed motor such as a brush shifting alternating current motor or a direct current motor with adjustable field strength to enable the frequency of the stroke to be changed. This would be useful in a process where the flow rate must be changed during the process, either as a step change or as a programmed gradient. It will be understood that the invention is not limited to operating a single pump from a drive system and does not exclude the utilizing of two or three or more liquid end assemblies duplexed or triplexed from the same drive system to reduce the inherent pulsations of a reciprocating type metering pump which may be important in applications requiring pulsationless operations such as liquid chromatography.

Specific arrangements and structural relationships have been illustrated and described by way of example, but it will be understood that the invention is not limited to the embodiment illustrated and various modifications will suggest themselves to those skilled in the art without departing from the spirit and scope of the invention.

What is claimed is:

1. In a pump having a reciprocating plunger with forward and return strokes, piston means axially movable with respect to a sealed bore and a coupling between the plunger and the piston means, connected thereto, the improvement which comprises that:

the piston means includes a piston of smaller diameter extending in the sealed bore and a piston holer of greater diameter having a bore and an end surface, the plunger has a bore and an end surface, the coupling is in the form of a wire composed of a material having the properties of steel with a high modulus of elasticity, and being secured at the ends in the bores of said piston holder and said plunger, the end surfaces of the plunger and the piston holder are adapted to abut each other whereby upon a forward stroke of the plunger it presses against the piston holder axially, and the diameter of the bore of the plunger from the end surface bearing against the abutting surface of the piston holder to a point spaced from such end surface is of greater diameter than the remaining portion of the coupling-receiving bore, whereby the coupling wire has lateral freedom of movement adjacent the piston means enabling the piston means to float laterally.

2. The improvement defined in claim 1, wherein the piston means comprises a piston, and a piston holder with first and second ends, having the piston secured to the first end of the piston holder and with the piston holder secured at the second end to said coupling, the piston constituting the portion of the piston means with smaller diameter.

3. The improvement defined in claim 2 wherein one of the abutting surfaces of the plunger and the piston holder is approximately spherical to provide some freedom of bending motion of one relative to the other, whereby flotation of the piston with respect to its sealing means is accommodated.

4. The improvement defined in claim 3 wherein the abutting end surface of the plunger is the approximately spherical surface.

5. The improvement defined in claim 2 wherein the plunger bore is open to the end away from the surface bearing against the piston holder to permit pulling and setting the tension of the coupling wire.

6. The improvement defined in claim 5 wherein the coupling wire is pulled into the plunger with sufficient tension to prevent separation of the abutting surfaces of the plunger holder upon the stroke of the plunger in the direction away from the piston holder.

7. The improvement defined in claim 1, wherein an eccentric cam is provided for driving the plunger in one direction and a compression spring is provided for returning the plunger in a return stroke.

8. The improvement defined in claim 7 wherein a driving shaft is provided carrying a cam adapted to drive the plunger axially on a forward stroke and the cam is rotationally, adjustably mounted on the driving shaft with the center of rotation for adjustment eccentric with respect to the axis of the drive shaft, whereby the degree of eccentricity of the cam with respect to the drive shaft may be varied for adjusting the stroke of the plunger.

9. The improvement defined in claim 1 wherein the sealed bore for the piston is provided with a liquid end having a port therein containing a valve seat, a valve guide adjacent the valve seat having a cylindrical bore coaxial with the valve seat, a ball stop adjacent the valve guide and a ball axially movable in the bore of the valve guide between the valve seat and the valve stop for controlling flow through the ports with the stroke of the piston to allow full flow through the pump without causing a differential pressure build up, with limited ball travel and low fluid entrapment.

10. The improvement defined in claim 9 wherein the valve guide is composed of a material having the properties of a fluorocarbon polymer.

11. The improvement defined in claim 2 wherein the pump includes a cylinder block with a hollow cylinder, a seal cartridge is provided in said hollow cylinder for the piston, said cartridge has groove means therein containing sealing means filling the groove means and pressing against the piston, and the sealing means includes a cap seal embracing the piston and an O-ring in the groove means surrounding the cap seal to press the cap seal against the piston.

12. The improvement defined in claim 11 wherein the cap seal is composed of a fluorocarbon polymer.

* * * * *